(12) United States Patent
Agombar et al.

(10) Patent No.: US 8,195,906 B2
(45) Date of Patent: Jun. 5, 2012

(54) METHOD AND SYSTEM FOR CASCADED FLASHCOPY ZONING AND ALGORITHM AND/OR COMPUTER PROGRAM CODE AND METHOD IMPLEMENTING THE SAME

(75) Inventors: John P. Agombar, Winchester (GB); Christopher B. E. Beeken, Eastleigh (GB); Stephanie Machleidt, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 841 days.

(21) Appl. No.: 12/186,838

(22) Filed: Aug. 6, 2008

(65) Prior Publication Data

US 2010/0036996 A1  Feb. 11, 2010

(51) Int. Cl.
 *G06F 12/00* (2006.01)
(52) U.S. Cl. ............ 711/165; 711/4; 711/5; 711/100; 711/102; 711/103; 711/161; 711/162
(58) Field of Classification Search .................. 711/4–5, 711/100, 102–103, 161–162
See application file for complete search history.

(56) References Cited

U.S. PATENT DOCUMENTS

| | | | | |
|---|---|---|---|---|
| 2005/0278391 | A1* | 12/2005 | Spear et al. | 707/201 |
| 2006/0139697 | A1* | 6/2006 | Fuente | 358/296 |
| 2006/0143413 | A1* | 6/2006 | Agombar et al. | 711/162 |
| 2006/0200640 | A1 | 9/2006 | Agombar et al. | |

* cited by examiner

*Primary Examiner* — Tuan Thai
*Assistant Examiner* — Zhou Li
(74) *Attorney, Agent, or Firm* — Randall J. Bluestone; Roberts Mlotkowski Safran & Cole, P.C.

(57) ABSTRACT

A method of performing cascaded flashcopy (FC) including starting a flashcopy map when a target disk is already a source of an active FC map. A computer storage system includes a configuration that allows a flashcopy (FC) map to be started when a target disk is already the source of an active FC map.

17 Claims, 5 Drawing Sheets

FIG. 8

| zone Bitmap | Read | Write |
|---|---|---|
| (0,0,0,0) | R | W |
| (1,0,0,0) or (0,1,0,0) | if S(up) then<br>  R<br>else<br>  R(up) | if S(dn) then<br>  W<br>else<br>  R and W(dn); W |
| (1,0,1,0) or (0,1,0,1) | R | if S(dn) then<br>  W<br>else<br>  R and W(dn); W |
| (1,1,1,0) | if C(0) then<br>  R<br>else if C(1) then<br>  if S(up) then<br>    R<br>  else<br>    R(up)<br>else if C(0&1) then<br>  if Ph1 head passed then<br>    R<br>  else<br>    if S(up) then<br>      R<br>    else<br>      R(up) | if S(dn) then<br>  W<br>else<br>  if S(up) then<br>    R and W(dn); W<br>  else<br>    R(0) and W(0,dn); R(1) and W(1,dn); W |
| (1,1,0,1) | if C(1) then<br>  R<br>else if C(0) then<br>  if S(up) then<br>    R<br>  else<br>    R(up)<br>else if C(0&1) then<br>  if Ph0 head passed then<br>    R<br>  else<br>    if S(up) then<br>      R<br>    else<br>      R(up) | if S(dn) then<br>  W<br>else<br>  if S(up) then<br>    R and W(dn); W<br>  else<br>    R(1) and W(1,dn); R(0) and W(0,dn); W | where

| | | | |
|---|---|---|---|
| S(up) | = upstream grain is split | W(0,dn) | = zone 0 write to next disk downstream |
| S(dn) | = downstream grain is split | W(1,dn) | = zone 1 write to next disk downstream |
| R | = read from this disk | C(0) | = client disk in zone 0 |
| R(up) | = read from next disk upstream | C(1) | = client disk in zone 1 |
| R(0) | = zone 0 read | C(0&1) | = client disk in zones 0 and 1 |
| R(1) | = zone 1 read | Ph(0) | = zone 0 |
| W | = write to this disk | Ph(1) | = zone 1 |
| W(dn) | = write to next disk downstream | | |

METHOD AND SYSTEM FOR CASCADED FLASHCOPY ZONING AND ALGORITHM AND/OR COMPUTER PROGRAM CODE AND METHOD IMPLEMENTING THE SAME

FIELD OF THE INVENTION

The invention generally relates to computer storage systems which utilize or provide a configuration or scheme that allows a FlashCopy® (FC) map to be started when a target disk is already the source of an active FC map.

BACKGROUND

A cascaded FC configuration is one where the source disk of one map is the target disk of another map. For example, there may be one map defined with source disk A and target disk B, and another map defined with source disk B and target disk C. The cascade would include the three disks A, B and C and the two maps.

Current implementations of FC do not allow maps to be started when the FC target disk is an active source disk of another FC map. This means that the user either has to wait for the first map to complete before the second map can be started, or the first map has to be stopped before the second map can be started. In the former case, it can take a very long time (depending on, among other things, the size of the disks in the FC map and the rate at which the data is being copied) for the FC map to complete which is not ideal and/or may not be desirable. In the latter case, stopping the FC map results in an incomplete first copy, which may not be desirable.

An exemplary scenario illustrating this behavior on FC maps A→B and B→C can be demonstrated as follows: A→B is started and completes before B→C is started (e.g., because it is an incremental map). However, if and/or when B→C is started, A→B cannot be restarted until B→C completes (i.e., when C is independent of B). In an environment where multiple snapshots of a set of data are being taken, for example, for running simulations against and for backing up data after the simulation has run, this situation can frequently occur.

A disk in an FC map is said to be dependent on one or more other disks when it does not hold a complete copy of the data itself that it is presenting to the user. If this disk receives a read request for data that it does not hold, then it redirects the read to whichever other disk does hold this data. Conversely, a disk is said to be independent when it holds a complete image of the data that is presenting to the user. It can satisfy all read requests itself without needing to redirect the request elsewhere.

Another problem with cascaded FC relates to the behavior of a cascade when a FC map has an independent target disk image, but that target is a source for other maps. There are two ways of manipulating the cascade when this occurs.

In one or the first case, the target disk can be removed from the cascade once all downstream disks are independent of the target. That is, in the case of a cascade of A→B→C→D, if B becomes independent of A, and C is not dependent on B, then one can modify the cascade to achieve A→C→D. This approach allows the FC map A→B to be restarted, but leaves C dependent on A. This does not seem natural for a FC map which the user created from B to C. Note that the user would not be able to delete disk A even though the only map that contained this disk is now complete.

In another or the second case, the source disk can be removed from the cascade because the target no longer requires its source disk in order to maintain the image presented to the host. That is, in the case of a cascade A→B→C→D, if B becomes independent of A, then A can be dropped from the cascade leaving B→C→D. This approach appears more natural to the user and does not require the user to wait for C to become independent of B. However, without the invention, it also means that the map A→B cannot be restarted until C is independent of B.

All these situations greatly reduce the usability of cascade FC implementations. Accordingly, there exists a need in the art to overcome the deficiencies and limitations described hereinabove.

SUMMARY

In a first aspect of the invention, there is provided a method of performing cascaded flashcopy (FC) comprising starting a flashcopy map when a target disk is already a source of an active FC map.

In a second aspect of the invention, there is provided a computer storage system including a configuration that allows a flashcopy (FC) map to be started when a target disk is already the source of an active FC map.

In a third aspect of the invention, there is provided a method of performing cascaded flashcopy (FC) comprising utilizing at least one zone, starting a flashcopy map when a target disk is already a source of an active FC map. The at least one zone is a zone in an FC cascade.

BRIEF DESCRIPTION OF THE SEVERAL VIEWS OF THE DRAWINGS

The present invention is described in the detailed description which follows, in reference to the noted plurality of drawings by way of non-limiting examples of exemplary embodiments of the present invention.

FIG. 8 shows a table describing rules for how reads and writes are handled in the cascade of FIG. 7 depending on the zone bitmap of a disk.

DETAILED DESCRIPTION

FlashCopy (FC) is a registered trademark of IBM. A FlashCopy® operation involves establishing a logical point in time relationship between source and target disks on the same or different devices and subsequently copying the data subject to the relationship from the source to target disks. The FC operation guarantees that until a grain in a FC relationship has been hardened to its location on the target disk, the grain resides on the source disk.

The invention relates to a configuration scheme that allows a FlashCopy® (FC) map to be started when the target disk is already the source of an active FC map. The configuration or scheme introduces the concept of a zone in a FC cascade. A zone relates to the scope of an I/O (input/output and/or write to a disk or read from a disk) in terms of the set of disks that are read from for a read to a given disk and the set of disks that can be written to due to data being pushed down the cascade for a write to a given disk. By using these I/O zones, a FC map can be started on a target disk even if this disk is also the source disk of an active FC map. This means that the problems described herein do not arise. Moreover, the cascade can be manipulated as in the second case (described above) because the map A to B can be restarted, since it would result in a new zone being created.

As used herein, the term "grain" means a set of consecutive LBAs represented by a bit in a split bitmap. An LBA is a logical block address. A disk is split into a number of equal size blocks. A given block is accessed via its logical block address. A split bitmap describes if a grain has been written to the target disk, i.e., if the grain has been split. As used herein, the term "write" means a "whole grain write". Of course, this idea can easily be extended to handle partial grain writes. The term "zone" means an ordered list of disks where all disks which are not the head of the list are dependent on data on the head. A zone bitmap is defined as a 4-tuple of booleans, i.e., bool in_zone_0, bool in_zone_1, bool head_of_0, bool head_of_1. The first two booleans describe whether a disk is in zone 0 or 1. The last two booleans describe whether the disk is the head of zone 0 or 1. A value of 1 means true, 0 means false. Each disk has its own zone bitmap. This is generally the only additional metadata required to implement the invention. Finally, a client disk is the disk where a read or write originated.

The following will describe various non-limiting examples of cascade constructions and show how to populate the zone bitmap when a disk is added to a cascade, i.e., when a FC map is started.

Figure 1:
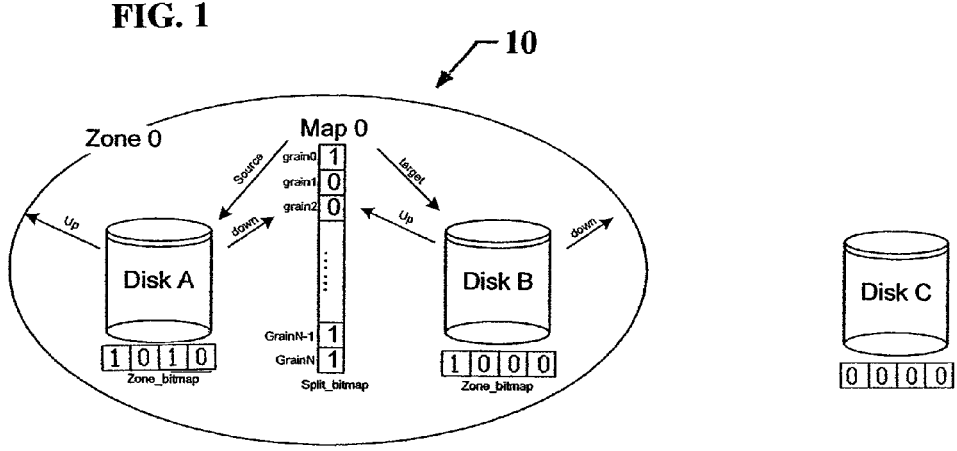
FIG. 1 shows an additional disk C before it is included in a map with source B and target C where B is already in a zone having a single map with source disk A and target disk B.
Figure 2:
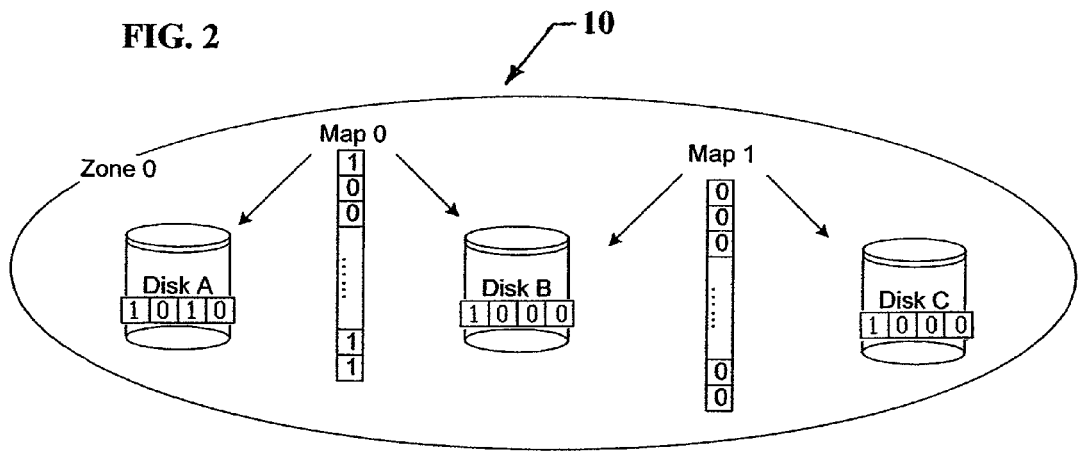
FIG. 2 shows the zone of FIG. 1 extended to included the additional disk according to one embodiment of the present invention.

FIGS. 1 and 2 illustrate one non-limiting way of populating a zone bitmap when a disk is added to a cascade, i.e., when a FC map is started. In FIG. 1, zone 10 contains a single map with source disk A and target disk B. In the case where it is desirable to start a new map with source disk B and target disk C, FIG. 2 shows that the zone 10 can be extended to include disk C. In this example, target disk C is dependent on disk B and disk B is dependent on disk A.

In particular, FIG. 1 shows a cascade containing a single mapping (Map 0). This includes source disk A and target disk B. The map has a split bitmap with a bit for every grain on the disks (normally source and target disks are the same size). There is a single zone in the cascade (zone 0) and a zone bitmap for each disk identifying the behavior of the disks in the cascade. Disk A has a zone bitmap 1010 which shows that the disk is in zone 0 and is the head of zone 0. Disk B has a zone bitmap 1000 which shows that the disk is in zone 0, but is not the head. Disk C is not participating in a FC mapping and therefore its zone bitmap 0000 shows that it is not in either zone. Disk A has no upstream bitmap and has map 0 as its downstream bitmap. Disk B has map 0 as its upstream bitmap and has no downstream bitmap.

In FIG. 2, there is shown what the cascade looks like after a cascaded construction step wherein a new map (map 1) is started with source disk B and target disk C and zone 0 is extended to include disk C as shown by its zone bitmap. Disk A has zone bitmap 1010, disk B has zone bitmap 1000 and disk C has zone bitmap 1000.

Figure 3:
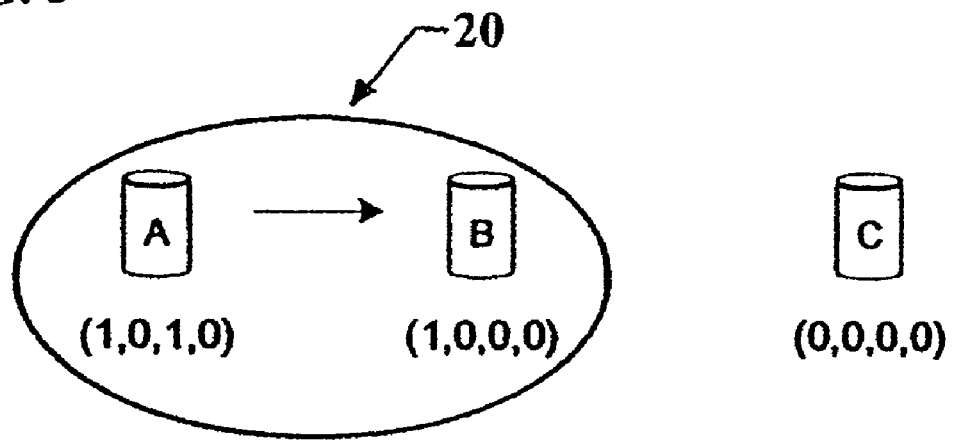
FIG. 3 shows an additional disk C before it is included in a map with source C and target A where A is already in a zone having a single map with source disk A and target disk B.
Figure 4:
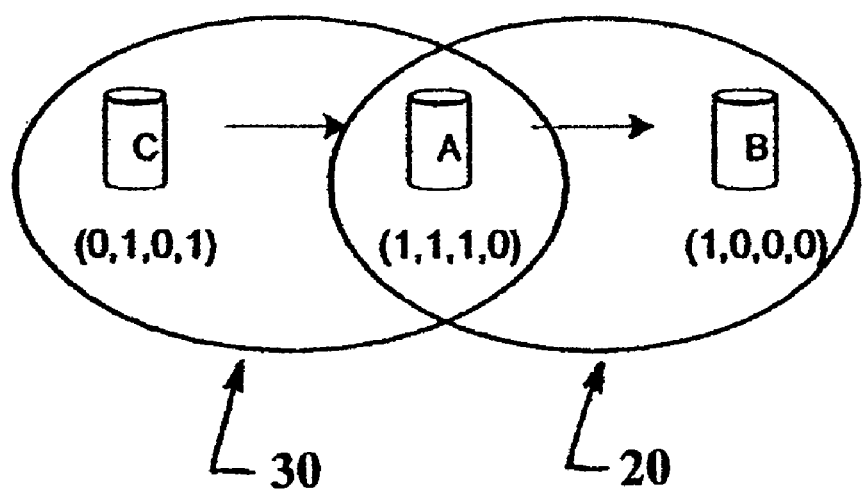
FIG. 4 shows the zone of FIG. 3 preceded with a new zone containing the additional disk according to one embodiment of the present invention.

FIGS. 3 and 4 illustrate another non-limiting way of populating a zone bitmap when a disk is added to a cascade, i.e., when a FC map is started. In FIG. 3, zone 20 contains source disk A and target disk B. In the case where it is desirable to start a new map C→A, FIG. 4 shows that the new map with disk C creates new adjacent zone 30 in front of the existing cascade or zone 20. As a result, the source disk C is the head of new zone 30, while disk A is a target disk of new zone 30. Furthermore, the disk B remains a target disk in zone 20 while disk A is the head of the existing zone 20. In this example, target disk B is dependent on disk A and disk A is dependent on disk C.

Figure 5:
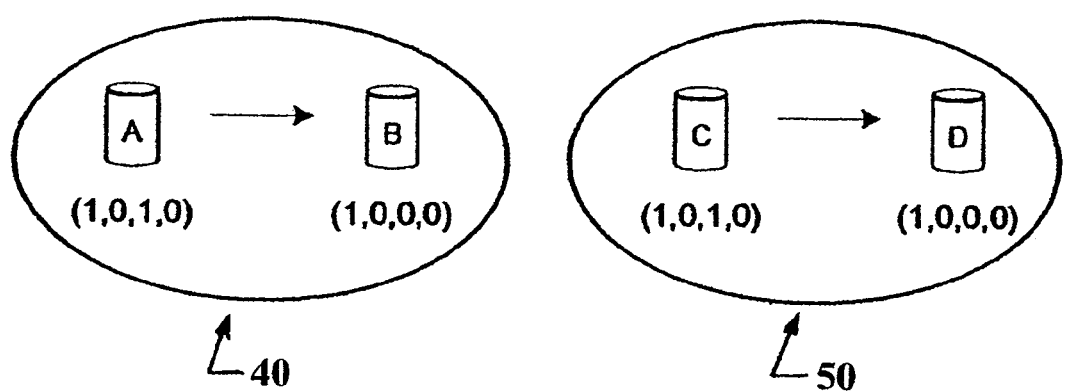
FIG. 5 shows first and second zones each having a single FC map with a source disk and a target disk.
Figure 6:
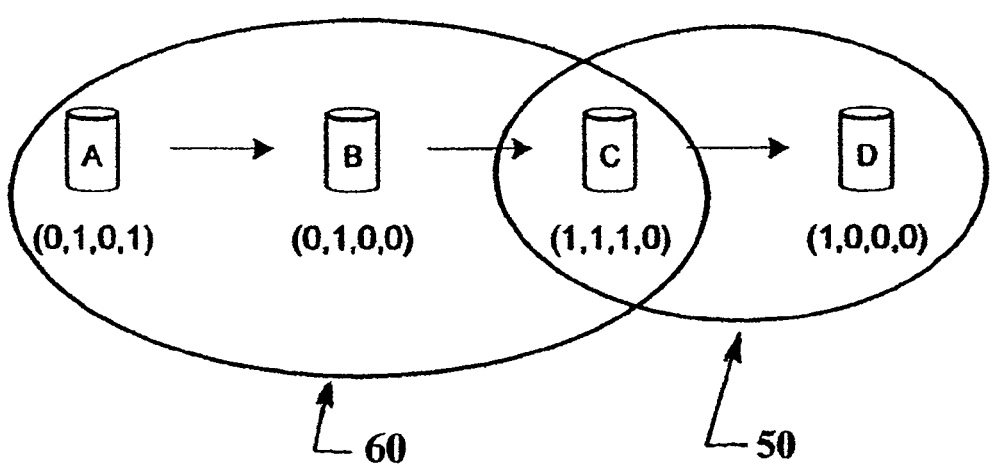
FIG. 6 shows the first zone of FIG. 5 extended when a new FC map is started with a source disk B and a target disk C according to one embodiment of the present invention.

FIGS. 5 and 6 illustrate still another non-limiting way of populating a zone bitmap when a FC map is started that links together two pre-existing cascades, i.e., when a FC map is started with a source disk in one zone and a target disk in another zone. FIG. 5 shows a case where it is desirable to start a new map B→C, but wherein zone 50 contains disks C and D and zone 40 contains disks A and B. This example is an extension of the previous example. In FIG. 6, the disks for the new map B and C are placed in a new zone 60 at the front of the existing cascade. Because disk B was already participating in zone 40, other disks within that zone must also be modified to be in new zone 60. In particular, the head, i.e., disk A, of zone 40 must be modified to be the head of the new extended zone containing disks A, B and C. This zone modification ripples up the cascade until it finds the very first head of a zone. As is evident from FIG. 6, since new disks are added to the head or tail of an existing cascade it can be seen that any one disk can participate in at most two zones. When a disk does participate in two zones, i.e., disk C, it must be the head of one or the other of them, i.e., disk C will be the head of zone 50.

In each of the above-noted examples, the 4 bit zone bitmap for each disk is sufficient to describe all possible combinations of zones within a single cascade.

Figure 7:
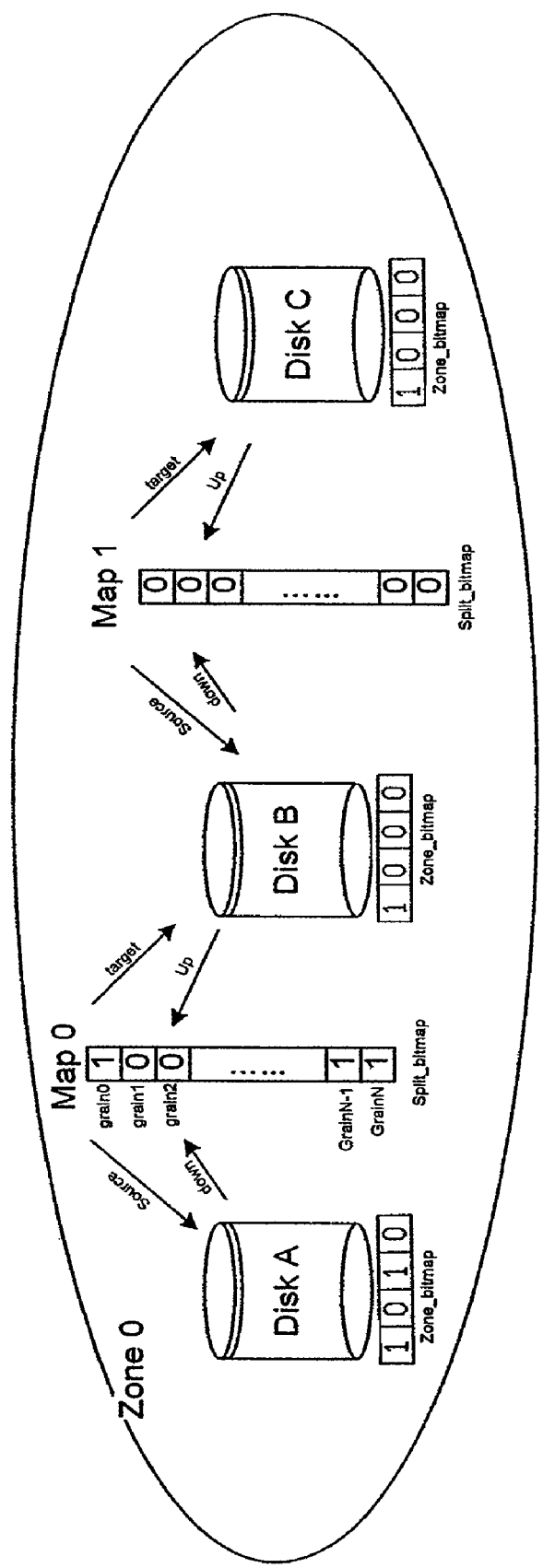
FIG. 7 shows a cascade with three disks and two maps according to one embodiment of the present invention.

FIG. 7 shows a cascade with three disks A, B and C and two maps, i.e., map 0 and map 1, according to one embodiment of the present invention. Map 0 has source disk A and target disk B. Map 1 has source disk B and target disk C. Disks A, B and C are all in zone 0. Disk A is the head of zone 0. No disks are in zone 1 in this example. The bitmap for map 0 is the downstream split bitmap for disk A and the upstream split bitmap for disk B. The bitmap for map 1 is the downstream split bitmap for disk B and the upstream split bitmap for disk C. Disk A does not have an upstream split bitmap. Disk C does not have a downstream split bitmap. Disk A has zone bitmap 1010, disk B has zone bitmap 1000 and disk C has zone bitmap 1000.

FIG. 8 shows a process setting forth an algorithm and/or rules for how reads and writes to a disk in a cascade would be handled dependent on the status of a FC split bitmap and the disk zone bitmap. The table shows the improvements in the capability that can be provided in a cascaded flashcopy environment with minimal extra metadata requirements. When processing a read or write 10, the zone bitmap needs to be considered to determine the action required. In particular, the table shown in FIG. 8 describes exactly how reads and writes will be handled depending on the zone bitmap of a disk and the split bitmap of the FC map. The table is first examined for the client disk. If this redirects the IO to the next disk up or down the cascade, then the table needs to be reapplied for that disk. These rules ensure that for a disk in a single zone, an IO operation is guaranteed to be serviced by the disks within its zone. For a disk that is in multiple zones, the existing data for the disk is preserved for the downstream zone before the IO is serviced by the disks in the upstream zone.

It will be clear to one skilled in the art that the method of the present invention may suitably be embodied in a logic apparatus comprising logic to perform the steps of the method, and that such logic may comprise hardware components or firmware components.

It will be appreciated that the method described above may also suitably be carried out fully or partially in software running on one or more processors (not shown), and that the software may be provided as a computer program element carried on any suitable data carrier (also not shown) such as a magnetic or optical computer disc. The channels for the transmission of data likewise may include storage media of all descriptions as well as signal carrying media, such as wired or wireless signal media.

The present invention may suitably be embodied as a computer program product for use with a computer system. Such an implementation may comprise a series of computer readable instructions either fixed on a tangible medium, such as a computer readable medium, for example, diskette, CD-ROM, ROM, or hard disk, or transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, pre-loaded with a computer system, for example, on a system ROM or fixed disk, or distributed from a server or electronic bulletin board over a network, for example, the Internet or World Wide Web.

It will be further appreciated that embodiments of the present invention may be provided in the form of a service deployed on behalf of a customer to offer offsite disaster recovery services.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims, if applicable, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated. Accordingly, while the invention has been described in terms of embodiments, those of skill in the art will recognize that the invention can be practiced with modifications and in the spirit and scope of the appended claims.

What is claimed:

1. A method of performing cascaded flashcopy (FC) comprising:
    starting a flashcopy map when a target disk is already a source of an active FC map,
    wherein the starting utilizes at least one zone,
    the at least one zone is a zone in an FC cascade,
    each respective disk in the FC cascade has a respective zone bitmap, and
    the respective zone bitmap for a said respective disk defines: a particular zone the respective disk is in, and whether the respective disk is a head of the particular zone.

2. The method of claim 1, wherein the at least one zone describes a scope of I/O in terms of a set of disks that are read from and written to.

3. The method of claim 1, wherein the at least one zone describes a scope of I/O in terms of a set of disks that are read from for a read to a given disk and the set of disks that can be written to due to grains being pushed down the cascade for a write to a given disk.

4. The method of claim 1, wherein the at least one zone is an I/O zone and further comprising using the I/O zone, starting a FC map on a target disk even if the target disk is also a source disk of an active FC map.

5. The method of claim 1, wherein the at least one zone comprises a source disk A and a target disk B, and further comprising adding another disk C to the zone such that the added disk C becomes a new target disk, whereby disk C is dependent on disk B and disk B is dependent on disk A.

6. The method of claim 1, wherein the at least one zone comprises a source disk and a target disk, and further comprising adding another disk to the zone such that the added disk becomes a new target disk.

7. The method of claim 1, wherein the at least one zone comprises a source disk A and a target disk B, and further comprising creating an adjacent zone having a disk C as a target disk such that the disk A becomes a new target disk for the zone containing the disk C and such that the disk B is dependent on the disk A.

8. The method of claim 1, wherein the at least one zone comprises a source disk A and a target disk B, and further comprising creating an adjacent zone having a disk C as a target disk such that the disk A is dependent on the disk C and the disk B is dependent on the disk A.

9. The method of claim 1, wherein the at least one zone comprises a first zone having a source disk A and a target disk B, and further comprising placing a second zone having a source disk C and a target disk D adjacent the first zone.

10. The method of claim 9, wherein disk D is dependent on disk C, disk C is dependent on disk B, and disk B is dependent on disk A.

11. The method of claim 9, wherein disk C is the target disk of the first zone and the source disk of the second zone.

12. A computer storage system comprising a configuration that allows a flashcopy (FC) map to be started when a target disk is already the source of an active FC map, wherein the configuration utilizes at least one zone in an FC cascade, each respective disk in the FC cascade has a respective zone bitmap. and the respective zone bitmap for a said respective disk defines: a particular zone the respective disk is in, and whether the respective disk is a head of the particular zone.

13. The system of claim 12, at least one of:

the at least one zone describes a scope of I/O in terms of a set of disks that are read from and written to; and the at least one zone describes a scope of I/O in terms of a set of disks that are read from for a read to a given disk and the set of disks that can be written to due to grains being pushed down the cascade for a write to a given disk.

14. The system of claim 12, wherein the at least one zone is an I/O zone and wherein the I/O zone is utilized to start a FC map on a target disk even if the target disk is also a source disk of an active FC map.

15. The system of claim 12, wherein the at least one zone comprises a source disk A and a target disk B, and the system is configured to create an adjacent zone having a disk C as a target disk such that the disk A becomes a new target disk for the zone containing the disk C and such that the disk B is dependent on the disk A.

16. A method of performing cascaded flashcopy (FC) comprising:

utilizing at least one zone, starting a flashcopy map when a target disk is already a source of an active FC map, wherein the at least one zone is a zone in an FC cascade, each respective disk in the FC cascade has a respective zone bitmap, and the at least one zone comprises a source disk A and a target disk B, and further comprising adding another disk C to the zone such that the added disk C becomes a new target disk, whereby disk C is dependent on disk B and disk B is dependent on disk A.

17. The method of claim 16, wherein the respective zone bitmap for a said respective disk defines: a particular zone the respective disk is in, and whether the respective disk is a head of the particular zone.

* * * * *